United States Patent [19]
Upton

[11] 3,808,809
[45] May 7, 1974

[54] FLUID UNIT WITH AUXILIARY ROTOR

[75] Inventor: Ernest W. Upton, Bloomfield Hills, Mich.

[73] Assignee: General Motors Corporation, Detroit, Mich.

[22] Filed: Nov. 29, 1972

[21] Appl. No.: 310,663

[52] U.S. Cl......................... 60/347, 60/349, 60/354, 60/364
[51] Int. Cl............................................. F16h 41/06
[58] Field of Search............ 60/330, 341, 342, 345, 60/347, 349, 352, 354, 357, 358, 362, 364, 365

[56] References Cited
UNITED STATES PATENTS

| | | | |
|---|---|---|---|
| 2,999,400 | 9/1961 | Kelley | 60/362 X |
| 3,189,144 | 6/1965 | Gabriel | 60/362 X |
| 3,263,522 | 8/1966 | General | 60/364 X |

*Primary Examiner*—Edgar W. Geoghegan
*Attorney, Agent, or Firm*—Charles R. White

[57] ABSTRACT

A torque converter having an auxiliary rotor which can be selectively connected to the input for pumping transmission fluid. The blades of this auxiliary rotor have a negative or backward bend with respect to direction of rotor rotation to modify the flow directed toward the bladed turbine by a bladed primary pump to reduce the capacity of the unit and provide for increased input speed and output torque.

5 Claims, 3 Drawing Figures

FLUID UNIT WITH AUXILIARY ROTOR

This invention relates to a hydrodynamic torque converter or a couping having an auxiliary rotor with blading having a negative or backward bend to selectively modify the flow from the primary pump into the turbine to reduce the torque absorption capacity of the unit.

The angle or bend of the pump blading is a primary determining factor affecting the stall torque ratio and pump speed characteristics of a fluid unit such as a torque converter. Many of the earlier developments involving torque converters were based on the use of pump blades of considerable negative or backward bend. For example, some early designs had pump blades curved in a backward direction from pump rotation to provide 75° negative exit angle with respect to the axis of the converter. While these designs produced high stall torque ratios, their torque capacity was low requiring large diameter units. To compensate for this, pumps having blades with forward or positive bends and exit angles were employed. While these latter pumps provided a desired increase in converter capacity and improved converter and coupling efficiency at high speed ratios, they recuced the stall torque ratio of the converter which detracted from vehicle performance.

The hydrodynamic torque transmitting unit of this invention is a variable capacity unit which can be conditioned for low capacity operation to provide for high stall torque ratios for performance and subsequently the capacity of the unit can be increased to a maximum capacity for high converter and coupling efficiency for the higher speed ratios. In the preferred embodiment of this invention there is new and improved auxiliary pump construction that has blades with a negative or backward bend which is interposed between the bladed primary pump and turbine. The blades of the primary pump have a forward or positive bend, a zero bend or a slight negative bend. However, when both the primary and auxiliary pumps are active the large negative angularity of the auxiliary pump blading modifies the flow into the turbine to reduce the capacity of the fluid unit. With this reduced capacity the desired high stall torque ratio is obtained. For economical operation of the unit, a clutch can be disengaged to deactivate the auxilary pump so that the positive blading of the primary pump directs fluid into the turbine at an optimum angle for increased capacity and high converter and coupling efficiencies at the higher speed ratios.

Preferably, the clutch for controlling the auxiliary pump can be slipped to gradually effect the change in capacity of the fluid unit to provide for a smooth transition from low to high capacity to prevent the sudden loading of the vehicle engine. This invention further features a new and improved mounting means for the auxiliary pump construction that is outside of the torus of the fluid unit so that it does not interfere with the flow of fluid in the unit and detract from its efficiency. An improved clutch and clutch controls are provided to selectively connect the auxiliary pump to the housing of the unit. Preferably, the pressure of fluid within the unit is employed as a clutch engaging pressure and a converter feed pressure is employed as a clutch disengaging pressure when it is desired to take the auxiliary pump out of the circuit to increase the torque capacity.

It is an object, feature and advantage of this invention to provide a new and improved variable capacity torque transmitting unit in a vehicle drive wherein the operating characteristics of the fluid unit can be selectively controlled to provide optimum cruising performance under steady state road load conditions and also to provide high torque ratio performance for accelerating the vehicle.

It is another feature, object and advantage of this invention to provide a hydrodynamic torque transmitting unit having a plurality of bladed rotors forming a torus for circulating fluid fed thereto and wherein an auxiliary pump, situated in the flow circuit of the unit is selectively drivingly connected to the input to reduce the torque absorption capacity of the unit to provide for increased input speeds.

It is another feature, object and advantage of this invention to provide a variable capacity torque converter wherein the operating characteristics of the torque converter can be selectively controlled by a new and improved pump assembly including an auxiliary pump and an associated clutch mechanism to provide optimum cruising performance under steady state road load conditions when the auxiliary pump is inactive and for providing high torque ratio for accelerating vehicle when the auxiliary pump is active.

It is a further feature, object and advantage of this invention to provide a transmission mechanism of the type set forth wherein an auxiliary pump has blades with negative tip angles selectively connected by friction clutch means to an engine driven housing of the rotor unit to thereby modify the flow from a primary pump into a turbine, and reduce the torque absorption capacity of the hydrodynamic unit to provide for an increase in input speed for improving the performance.

These and other objects, features and advantages of this invention will be more apparent from the following detailed description and drawing in which.

Figure 1:
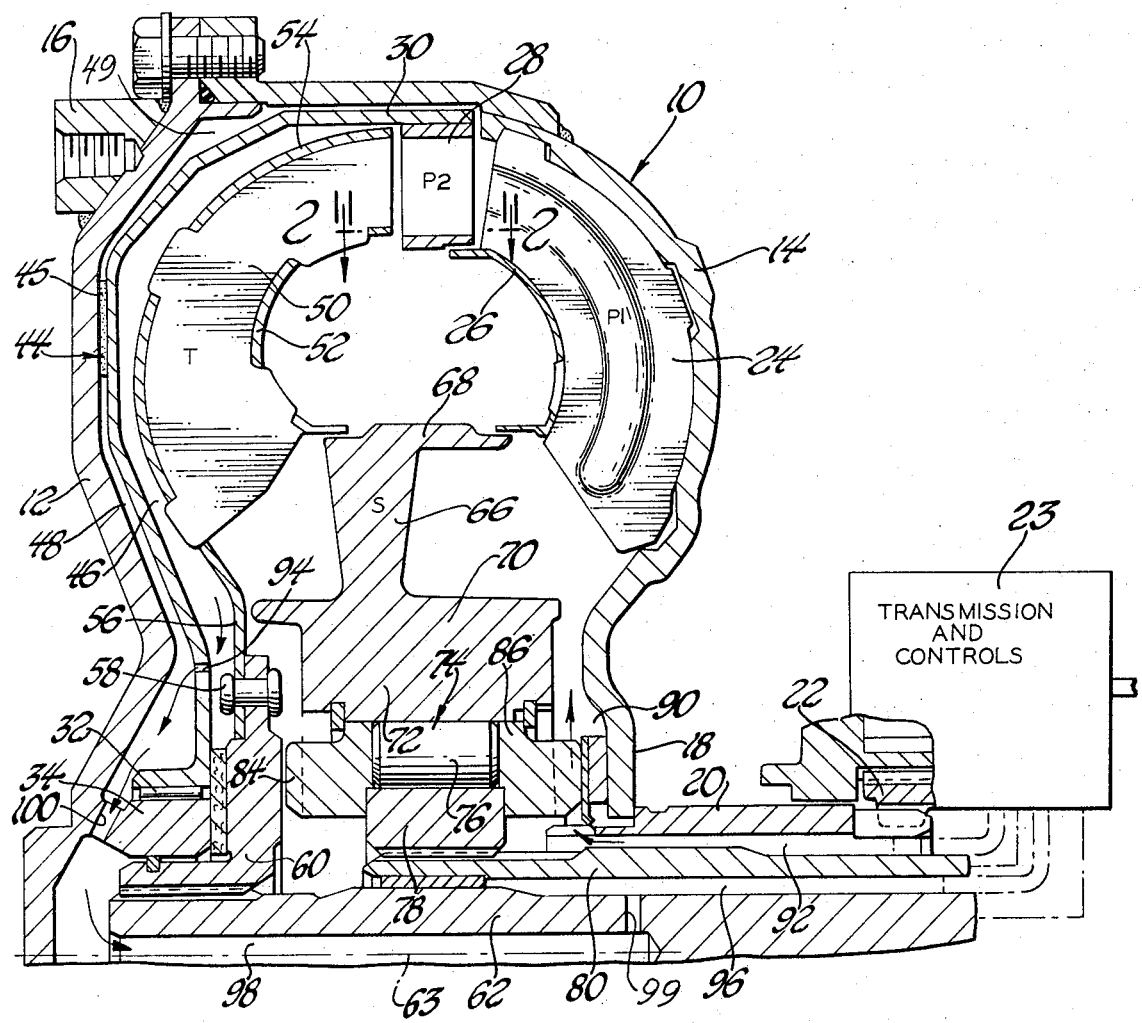
FIG. 1 is a longitudinal sectional view of an upper portion of a torque converter.

Turning now in more detail to FIG. 1, there is a torque converter 10 having front and rear covers 12 and 14 secured together to form a rotatable converter housing adapted to be driven by an engine through drive lugs 16 fixed to the front cover 12. The rear cover 14 has a central flange 18 that is drivingly connected to a sleeve shaft 20 which extends axially from the converter housing into driving engagement with an input gear 22 of an oil pump assembly that supplies operating oil for the transmission and transmission controls 23 and torque converter 10. Disposed within the converter housing is a primary pump P1, comprising an annular arrangement of spaced blades 24 secured to the rear cover 14 and to an inner annular shell 26, which is driven in a forward or clockwise direction by the engine. Adjacent to the outlet of this primary pump P1 is an auxiliary pump P2 comprising a plurality of equally spaced blades 28 which are secured to the interior of the rim of an annular supporting shell 30 that has a central hub mounted on a bearing 32 that is supported on an axially extending hub portion 34 of the front cover 12. A clutch 44 is operatively disposed between shell 30 and the inside of the front cover which when engaged drivingly connects the auxiliary pump P2 to the front cover so that the auxiliary pump can be driven along with the primary pump by the engine. Clutch 44 comprises an annular friction disc 45 bonded or otherwise secured to the outer surface of the support shell 30, which is drivingly engageable with a friction surface disposed on the interior of the front cover. Clutch 44 is engaged by the force of fluid pressure in chamber 46 formed between shell 30 and the outer shell 54 of the turbine when the clutch chamber 48 between the support shell 30 and front cover 12 is exhausted. Clutch 44 is disengaged when the converter is fed with fluid through the chamber 48 as will be later described. The space 49 between the shell 30 and front cover 12 above the friction disc 45 provides a fluid supply path for the converter as will be later described.

Disposed adjacent to the auxiliary pump P2 is a rotatable turbine T having a plurality of blades 50 that are connected between inner and outer shells 52 and 54. The outer shell has a central flange portion 56 that is connected by rivets 58 to the annular flange of a hub 60 which is rotatably journaled in hub portion 34 of the front cover and which is splined to an axially extending turbine shaft 62. A bladed stator S is operatively disposed between the turbine T and the inlet of the primary pump P1. This stator has a plurality of spaced blades 66 supported between ring-like inner and outer supports 68 and 70. The inner support 70 of the stator S is formed with an outer race for a one way brake 74. This one way brake has cylindrical rollers 76 disposed between the outer race 72 and an inner race 78 which is splined to one end of an axially extending ground sleeve 80 disposed around the turbine shaft 62. Turbine shaft 62 rotates around the axis 63 of the converter and extends out of the converter housing into a support connected to the transmission casing not shown. The one way brake engages to hold the stator against rotation in a rearward or counterclockwise direction during the torque multiplying phase of converter operation and disengages to allow the forward or clockwise rotation of the stator when turbine speed approaches the speed of the primary pump for the coupling phase of operation.

The stator has thrust rings 84 and 86 disposed on opposite sides of one way brake 74 which are fitted between inner support 70 of the stator and inner race 78. A first fluid passage 90 is formed in the converter between the one way brake 74 and flange 18 of the rear cover 14 which communicates with the controls 23 by a passage 92 formed between ground sleeve 80 and pump shaft 20. A small calibrated orifice 94 formed in the flange of the shell 30 provides a passage for feed or discharge fluid which communicates with the controls 23 through passage 96 formed between ground sleeve 80 and turbine shaft 62. As shown by FIG. 1 the clutch chamber 48 is hydraulically connected with passage 96 by axial passage 98 and radial passage 99 in turbine shaft 62 and by radial passages 100 formed in the front cover 12.

Figure 2:
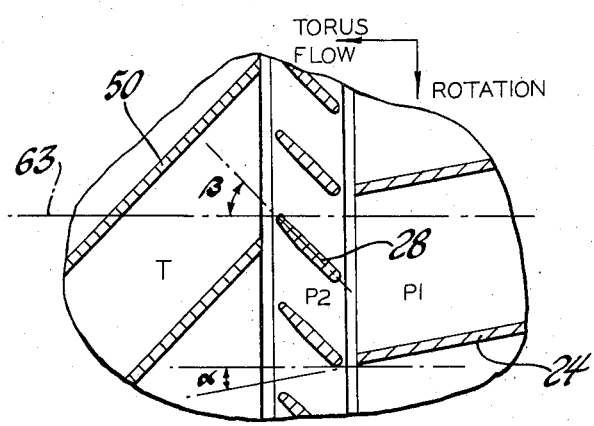
FIG. 2 is a view taken along lines 2—2 of FIG. 1.

In FIG. 2 there is illustrated a diagrammatic layout of the blading of the primary pump, the secondary pump and the turbine. The blades 24 of the primary pump P1 preferably have a bend in the direction of rotation and are positively inclined with respect to axis 63 to provide a positive discharge angle, angle $\alpha$, for fluid pumped therefrom. The blades of the auxiliary pump P2 are negatively inclined, angle $\beta$, in FIG. 2, and have a negative discharge angle. When the primary pump P1 is pumping fluid by itself the flow of the fluid is forward and enters the turbine at an optimum angle so that the turbine absorbs maximum energy from the rotating converter fluid. When the auxiliary pump P2 is clutched into the system by engagement of clutch 44 the negative angularity of the auxiliary blades reduces the forward flow of the fluid so that the torque absorption of the pump is reduced, resulting in high input speed for a given input torque.

Figure 3:
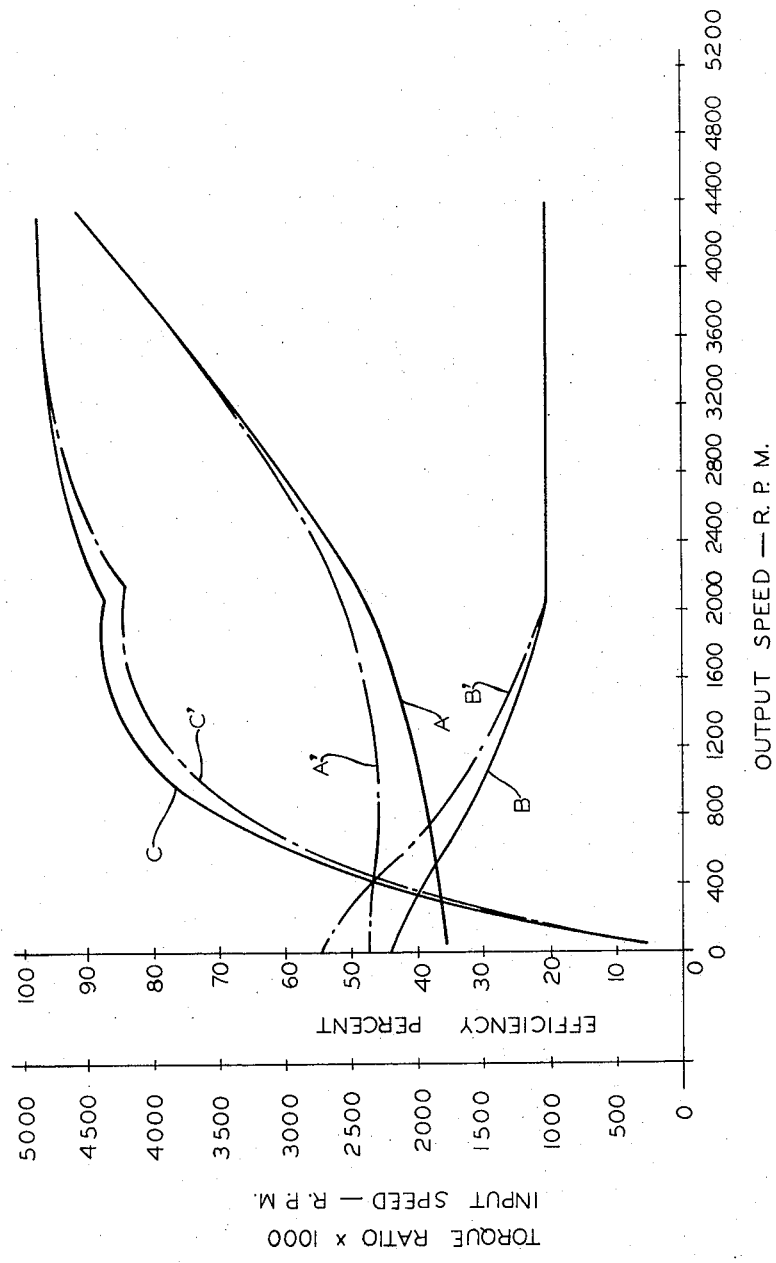
FIG. 3 is a graph illustrating operation of this invention at constant input torque.

The high and low capacity operations of the converter of this invention are illustrated in FIG. 3. Curves A, B and C respectively represent pump speed, torque ratio and efficiency of the converter in high capacity operation with clutch 44 disengaged and the auxiliary pump inactive. Curves A', B' and C' represent pump speed, torque ratio and efficiency respectively of the converter in low capacity operation with the clutch 44 engaged and the auxiliary pump active. All curves are shown on the basis of constant input torque. From these curves it will be seen that the operator can readily increase engine speed and converter torque multiplication at the expense of efficiency by activating the auxiliary pump to reduce converter capacity.

In the preferred mode of operation and assuming that it is desired to move the vehicle from a stationary position, the controls 23 are activated to feed pressure fluid to the converter through line 92, and into the power circuit of the converter through slots in thrust ring 86. Fluid is discharged from the converter through orifice 94 in shell 30, the passage 100 in cover 12, axial passage 98 and the connecting radial passage 99 of shaft 62 into line 96. Under these conditions there is a buildup of pressure including centrifugal pressure from the rotating pump in chamber 46. This pressure exerts an axial force on the support shell 30 directed toward the front cover 12 to cause the drive engagement of clutch 44. With clutch 44 engaged the auxiliary pump P2 is driven by the input. With the primary and auxiliary pumps pumping fluid the capacity of the converter is reduced permitting higher engine speed for initial propulsion of the vehicle. Since efficiency is reduced with the converter conditioned for low capacity, the capacity is increased by reversing the converter fluid feed and discharge to effect disengagement of clutch 44 so that the auxiliary pump is not active.

Thus, when the vehicle has gained sufficient momentum and torque requirements are reduced, the converter is fed through passage 96 radial passage 99, axial passage 98 and radial passage 100 into clutch chamber 48. From the clutch chamber fluid is fed into the power circuit of the converter through orifice 94 and also through the space or path 49 between shell 30 and the front cover 12. Fluid supplied in this latter path exits into the converter power circuit between the primary and auxiliary pumps $P_1$ and $P_2$. Fluid is discharged from the converter through passages 90 and 92. The fluid fed to the converter under these conditions, causes a buildup in pressure in chamber 48. The pressure in chamber 48 is greater than the pressure in chamber 46 because of the restrictions at orifice 94 in shell 30 and clutch disc 45 and moves the support shell 30 away from the front cover 12 to effect the disengagement of clutch 44 and the disengagement of the auxiliary pump from pumping action in the converter. Under these conditions the capacity of the converter increases from low capacity to high capacity operation. Preferably the slippage of the clutch 44 is controlled so that there is initially a low slippage which gradually increases so that the transition from low to high capacity is graduated, thus preventing sudden loading of the engine.

If it is desired to operate at low capacity for the complete converter operation, the clutch can be maintained by the continuous feeding of the fluid into the converter through passage 92 while exhausting chamber 48 so that clutch 44 is applied by the pressure in chamber 46. While the difference in centrifugal pressure on two sides of support shell 30 reduces as the turbine speed approaches the speed of the pump, the clutch 44 is still applied by the converter charging pressure in the housing which is being discharged through calibrated orifice 94. This low capacity operation can be beneficially used for operation of the vehicle at high altitudes where higher engine speeds are necessary for good engine operation.

While the embodiment of the invention shown in the drawings and described above constitutes a preferred embodiment and operation, it will be understood that other embodiments and other operations may be adapted such as fall within the scope of the appended claims.

I claim:

1. In a hydrodynamic torque transmitting unit, input and output means, a housing drivingly connected to said input means and rotatable about an axis, primary and secondary pump means and turbine means operatively disposed in said housing for circulating a fluid therein, means drivingly connecting said turbine means to said output means, support means mounting said secondary pump means for rotation relative to said housing, said primary pump means being connected to said housing and having a plurality of spaced fluid directing blades inclined with respect to said axis to provide a positive discharge angle for fluid pumped therefrom, said secondary pump means having spaced blades inclined with respect to said axis to provide a negative discharge angle for fluid pumped therefrom, said turbine means having blades receiving fluid pumped by said primary and secondary pump means and for converting the energy of the fluid into torque for driving said output means, and clutching means for selectively connecting said secondary pump means to said input to change the direction of flow of fluid from said primary pump means into said turbine means to reduce torque absorption capacity of said unit and increase the stall torque ratio of said unit, and control means for disengaging said clutching means to thereby deactivate said auxiliary pump means so that said primary pump means pumps fluid directly into said turbine means to effect an increase in the torque absorption capacity of said unit and a decrease in the stall torque ratio thereof.

2. In a hydrodynamic torque transmitting unit, a housing adapted to be driven about an axis of rotation by an engine, primary pump means operatively connected to said housing, auxiliary pump means operatively disposed in said housing adjacent to said primary pump means, support means mounting said auxiliary pump means for rotation relative to said housing, turbine means disposed adjacent to said auxilary pump means, output means, connector means coupling said turbine means to said output means, said primary pump means having blading with a forward bend with respect to said axis for directing fluid into said turbine at an angle allowing the turbine means to absorb a large percentage of the energy from the fluid circulated thereto, said auxiliary pump means having blading with a rearward bend with respect to said axis for modifying the flow from said primary pump means so that said turbine means absorbs a reduced percentage of energy from the fluid circulated thereto, and clutch means operatively connected to said support means and selectively engageable with said housing so that said auxiliary pump means is connected to and driven by said housing to modify the flow of fluid pumped by said primary pump means to thereby decrease the capacity of said unit and control means for disengaging said clutch means to release said auxilariy pump means from pumping action to effect an increase in the capacity of said unit.

3. A variable capacity hydrodynamic torque transmitting unit comprising a rotatable housing adapted to be driven about a rotational axis by an engine, primary pump means operatively connected to said housing, auxiliary pump means, support means rotatably mounting said auxiliary pump means in said housing, turbine means, output means operatively connected to said turbine means, said primary pump means having blading with a forward bend with respect to said axis for directing fluid into said turbine means at an angle allowing the turbine means to absorb a large percentage of energy from the fluids circulated thereto, said auxiliary pump means having blading with a rearward bend with respect to said axis for modifying the flow from said primary pump means so that said turbine absorbs a reduced percentage of energy from the fluid circulated thereto, and clutch means operatively disposed between said support means and said housing so that said auxiliary pump means can be drivingly connected to said housing for pumping action in said unit to modify the flow from said primary pump means into said turbine to decrease the capacity of said unit, and fluid feed means operatively connected to said clutch means for feeding fluid into said unit and for disconnecting said clutch means so that only said primary pump means pumps fluid in said unit to thereby increase the capacity of said unit.

4. A hydrodynamic torque converter comprising a housing adapted to be driven about an axis of rotation by an engine, primary pump means operatively connected to said housing for rotation therewith, turbine means operatively disposed in said housing for receiving fluid pumped by said primary pump means, an output operatively connected to said turbine means, stator means directly adjacent to said turbine means for directing fluid exiting from said turbine means into said primary pump means, auxiliary pump means disposed in said housing between said primary pump means and said turbine means, a support means disposed in said housing and entirely outside of said turbine means for supporting said auxiliary pump means for rotation and limited longitudinal movement along said axis, friction means carried by said support means for selective clutching engagement with said housing in response to predetermined movement of said support means toward an interior wall of said housing to drivingly connect said housing to said auxiliary pump means, said auxiliary pump means having fluid directing blading disposed at predetermined angles with respect to said axis to reduce the torque absorption capacity of said unit from its maximum capacity when drivingly connected to said housing.

5. The torque converter defined in claim 4 wherein said support means comprises an annular shell and wherein said shell and said housing form a separate chamber in said housing when said friction means is engaged with said housing, and control means for selectively feeding fluid to said converter through said chamber to effect the disengagement of said friction means from said housing and for exhausting said chamber so that the fluid within said converter will effect the engagement of said friction means with said housing.

* * * * *